July 17, 1962 K. G. KREUTER 3,044,402
CONTROL FOR FLUID SYSTEM
Filed July 2, 1959 2 Sheets-Sheet 1

INVENTOR.
KENNETH G. KREUTER
BY M. A. Hobbs
ATTORNEY

INVENTOR.
KENNETH G. KREUTER
BY M. A. Hobbs
ATTORNEY

United States Patent Office 3,044,402
Patented July 17, 1962

3,044,402
CONTROL FOR FLUID SYSTEM
Kenneth G. Kreuter, Goshen, Ind., assignor, by mesne assignments, to Robertshaw-Fulton Controls Company, Richmond, Va., a corporation of Delaware
Filed July 2, 1959, Ser. No. 824,734
6 Claims. (Cl. 103—25)

The present invention relates to a control mechanism and more particularly to a pressure responsive electrical control mechanism for fluid systems, such as, for example, automatically controlled, intermittently operated water well systems.

In conventional water well systems of the submersible pump type, the pump and motor for driving the pump are placed in the well below or near the normal water level in the well and are controlled by an electrical system which responds to the pressure in a storage tank or the like usually at or near ground level. The electrical system for controlling the motor includes a pressure responsive device which senses the pressure in the storage tank and starts or stops the pump motor in accordance with the quantity of water in the tank as determined by the pressure on the pressure responsive device. In the conventional system of this type, once the motor is started, it will continue to operate until the pressure in the storage tank has been returned to the degree indicating the desired high level amount of water in the tank. The motor then shuts off and remains off until the water pressure in the tank is again lowered to a predetermined point indicating the need for a further supply of water from the well. In this type of well system as in most other types the water level sometimes is lowered to a point below the pump intake and as a result the pump motor continues to operate indefinitely or until it is shut off by the use of a manual switch after the low water condition has come to the attention of the user. This continued useless operation of the pump causes wear and tear on the pump and motor and possibly serious damage or complete destruction of these units, unnecessarily reducing their life and needlessly increasing the service and maintenance costs throughout the life of the system. It is, therefore, one of the principal objects of the present invention to provide a control mechanism for such systems, which not only senses the storage tank water requirements but also effectively senses the failure of the pump to deliver water in response to the low water condition in the tank and stops the pump motor until the pump failure has been checked and corrected.

Another object of the invention is to provide an electrical mechanism for a pumping system of the foregoing type, which is compact and easy to regulate and adjust and which includes all the essential control elements in a single unit.

Still another object of the invention is to provide a system for performing the foregoing operations which can be manufactured and sold as a single unit ready for installation in the system, or in which the individual operating components are constructed as separate units and then assembled and/or connected to form the complete system when the system is installed.

A further object is to provide a control mechanism of the foregoing type which can be incorporated in a number of different types of fluid systems and which can readily be rearranged to meet installation and service requirements in a variety of fluid systems.

Additional objects and advantages of the present invention will become apparent from the following description and accompanying drawings, wherein.

Figure 1:
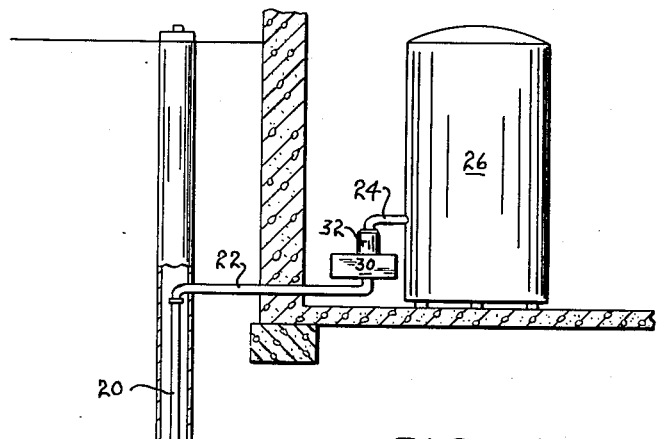
FIGURE 1 is a partial cross sectional and elevational view of a well and pumping system, regulated by the present electrical control system shown only in outline therein.
Figure 2:
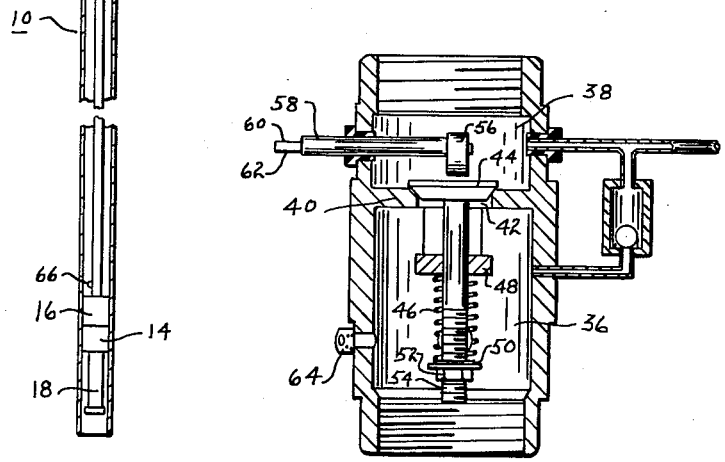
FIGURE 2 is a vertical cross section of a valve which is placed in the water line between the pump and storage tank.

Referring more specifically to the drawings and to FIGURE 1 in particular, numeral 10 designates a water well having a casing 12 in which is disposed a submersible pump 14 and motor 16, the pump having an inlet screen 18 therebelow normally fully submerged in the water in the well. The pump is connected by conduits 20, 22 and 24 with a storage tank 26 installed in the basement or utility room of a home, though it may be installed in any other location convenient to the user. My control mechanism 30 is shown installed in the water line between the pump and tank close to the tank where it can be easily reached for servicing and adjustments. It may, however, be located in any other convenient place in said line. My control is connected to a source of electrical current and to motor 16 by standard wiring (not shown).

When the motor is operating and the pump is delivering water from the well to the tank, the water passes upwardly through conduits 20 and 22 through a valve generally designated by numeral 32 located in the installation between conduits 22 and 24 near the tank. The valve consists of chambers 36 and 38 separated by a wall 40 having a central opening 42 therethrough. A valve element 44 seats on the outlet side of the opening and is urged to its seat by a spring 46 reacting between a support member 48 and a washer 50 held in place by a nut 52 on valve stem 54. The water pressure from the pump required to open valve element 44 can be adjusted by increasing or decreasing the compression on spring 46 by rotating nut 52. In order to restrict the extent to which the valve can be opened and thus control the pressure differential on opposite sides thereof, an adjustable stop means is provided on the posterior side of the valve element, consisting of a cam 56 mounted on the inner end of a rotatable shaft 58 which extends in sealed relation through the side wall of the valve and is provided with opposed flattened surfaces 60 and 62 for receiving a wrench for making an adjustment of the cam. As shaft 58 is rotated, cam 56 either moves toward or away from the upper side of the valve element and thereby varies the extent to which the valve can open. As the water is forced by the pump through the valve, valve element 44 is held open by the pressure of the water permitting the water to pass through the valve to the storage tank. When the motor stops, the pressure on the lower side of the valve 44 tending to open it is normally immediately relieved and the pressure of the water above the valve and the force of spring 46 close said valve. It is preferable to include in a system of this type a pair of check valves for releasing the water in conduits 20 and 22 after the pump has been shut off. A check valve 64 is placed in the wall of chamber 36 to admit air into the upper end of said conduits, and a check valve 66 is placed in conduit 20, preferably within the well casing to permit the water to drain from said conduits. Both check valves are closed when the pump is delivering water.

The pressure of the water in chamber 38 is substantially the same as that in the storage tank and, in the control shown in the drawing, this pressure may be utilized to operate the main electrical switch mechanism 70 for the pump motor. In the drawings, switch 70 controlling both lines 72 and 74 to the motor is illustrated as a manually operated throw switch, although it may be operated automatically by pressure responsive mechanism such as the type shown in my copending application Serial No. 793,527, filed on February 16, 1959, now U.S. Patent No. 2,990,780, or by an electrical mechanism responsive to some condition in the system. The present invention is primarily concerned with mechanims for preventing damage to the pump and pump motor in the event the pump fails to supply the system with water after the motor has been started or ceases to do so during the opperation of the pump.

Figure 4:
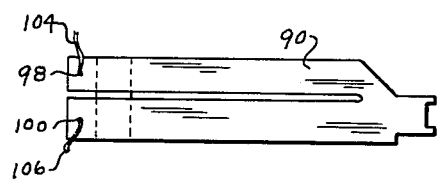
FIGURE 4 is a plan view of a part of a time delay power shut-off mechanism used in the electrical system.
Figure 3:
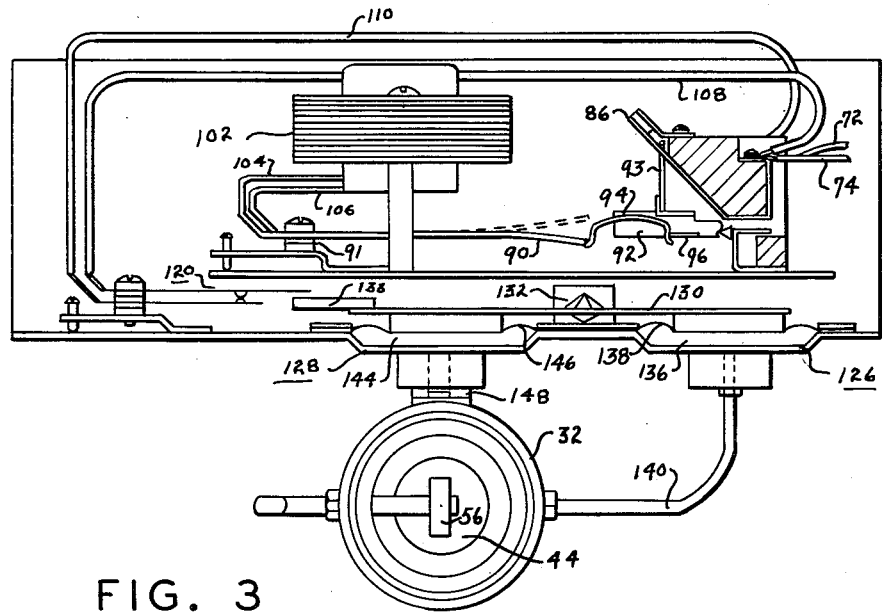
FIGURE 3 is a plan and partial cross sectional view of my control mechanism showing the manner in which the control is connected into the water system.
Figure 5:
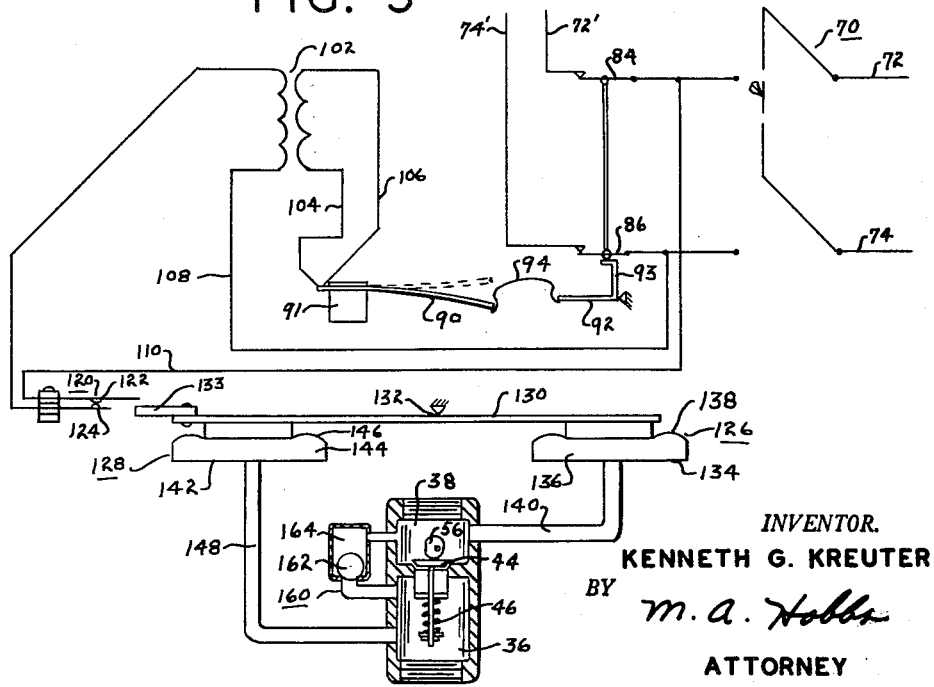
FIGURE 5 is a schematic diagram of the electrical system showing the manner in which it is operatively connected to the water supply system, the parts of the electrical system being rearranged and modified to better show the operation of said system.

The differential in pressures between the fluid in chambers 36 and 38 is utilized to regulate emergency or safety control switches 84 and 86 which are in series with switch 70 completing the circuit to leads 72' and 74' to the pump motor 16. These two switches are normally closed and are opened by a bi-metallic element 90 which in the position shown in FIGURE 3, permits switches 84 and 86 to remain closed and, in the position shown in broken lines, opens said switches. This element is rigidly supported at one end by an insulating block 91 and operatively connected at the other end to the switches by pivoted lever 92, lever 93 and toggle spring 94 bearing against the end of said element and against member 96 on lever 92. The actual shape of element 90 is shown in FIGURE 4 and, in the embodiment shown, forms a heating element when connected into a circuit at points 98 and 100. Since a low voltage circuit is required for heating element 90, a step-down transformer 102 is included in the unit and is connected to points 98 and 100 by leads 104 and 106 and is connected into the main motor circuit by leads 108 and 110.

The circuit to the transformer and element 90 is controlled by a switch 120 in lead 110, including contact elements 122 and 124, said switch normally remaining closed unless opened by a switch actuating mechanism consisting of pressure responsive units 126 and 128 and lever 130 pivoted at point 132, the left hand end of lever 130, as seen in the drawings, having an insulated operating finger 133 for contacting element 122. Unit 126 consists of a housing 134 having a chamber 136 closed on one side by a flexible diaphragm 138 and connected by a conduit 140 to chamber 38, and unit 128 consists of a housing 142 having a chamber 144 closed on one side by a flexible diaphragm 146 and connected by a conduit 148 to chamber 36. When the pressure in chambers 36 and 142 is greater than the pressure in chambers 38 and 136, finger 133 on lever 130 engages switch element 122 and moves it away from element 124, thus opening switch 120 to prevent element 90 from becoming warm and opening switches 84 and 86. Switch 120 is held open by this differential between the pressures in chambers 136 and 144 as long as the pump is operating properly to fulfill the demand in the water system. Spring 46 urges valve element 44 to its closed position and thereby sets a predetermined differential in pressure between chambers 136 and 144 required before water is delivered to the storage tank.

When the pump is not operating and an adequate supply of water is in the storage tank, the pressure in chamber 136 exceeds the pressure in chamber 144 and finger 133 is moved away from contact 122 permitting switch 120 to close. In the event the pump fails to deliver water when the pump motor is started, i.e. after switch 70 has been closed, the pressure in chamber 136 remains greater than the pressure in chamber 144, finger 133 remains retracted from element 122, and the switch remains closed. Consequently, the current to element 90 remains on, heating said element and causing it to shift to the position shown in broken lines, thereby opening switches 84 and 86 and interrupting the current to the pump motor.

Under normal operating conditions for most systems of the type described herein, the pressure in chamber 38 would be greater than the pressure in chamber 36 whenever the pump is inoperative, or operative but without a sufficient supply of water in the well to produce a flow to the tank. However, under certain conditions the water pressure in chamber 38 may fall below the pressure in chamber 36 and remain there even though the pump is not delivering any, or an appreciable amount, of water, i.e. not sufficient water to permit continued operation without damage to the pump and motor. The present dual pressure control of switch 120 by units 126 and 128 senses this condition and responds by permitting switch 120 to close, which in turn permits element 90 to open switches 84 and 86 and shut off the motor.

This is accomplished by a further safety device which has been included in the system consisting of a small bleed passage 160 by-passing valve 44. This passage is controlled by a ball check valve 162 in a chamber 164 which prevents the back flow of water around valve 44. In certain operating conditions, the water on the outlet side of valve 44 may be siphoned out, reducing the pressure therein to less than atmospheric pressure at the same time that the pump is unable to deliver a sufficient supply of water to open valve 44. Under these conditions, the pump motor would continue to operate without delivering any water. The by-pass eliminates this condition by permitting sufficient water to flow from chamber 36 to equalize the pressure in chambers 36 and 38 and thereby withdraw finger 133 from element 122. This permits element 90 to open switches 84 and 86 and shut off the pump motor.

In some installations, it may be desirable to have the pump automatically recycle. This type of operation can easily be obtained by connecting leads 108 and 110 to leads 72' and 74', i.e. between switches 84 and 86 and the motor. When switches 84 and 86 are opened by element 90 the current to element 90 is likewise interrupted so that on cooling it recloses said switch and starts the motor.

Although the present control mechanism has been illustrated in connection with a water supply system, it may be used satisfactorily in other kinds of system. Further, the switch mechanism 70 may be mounted on the tank or at some other convenient place and the mechanism containing switches 84 and 86 and element 90 may be mounted either adjacent to valve 32 or located at some other convenient place and connected to chamber 38 of the valve by a suitable conduit. Different types of time delay mechanisms can be substituted for heat responsive element 90. Various other changes and modifications may be made without departing from the scope of the present invention.

I claim:

1. An electrical control mechanism for a water supply system having a pump, a motor for said pump, and a delivery pipe connected for receiving water from the pump, comprising a first check valve in said pipe for preventing back flow therein and having a spring loaded valve element for regulating the pressure required to open the valve, a by-pass passage around said valve, a second check valve in said passage, in electric line to said motor, a switch in said line, a second switch in said line between said first mentioned switch and said motor, an electric means including a thermostatic element movable in response to temperature changes, a toggle linkage connecting said means with said second mentioned switch for opening said second switch when said element becomes warm, an electrical circuit connected to said line between said switches for heating said element, a switch in said circuit, a housing forming a chamber, a diaphragm forming a wall of said chamber, a conduit connecting said chamber with said pipe on the pump side of said first valve, a second housing forming a chamber, a diaphragm forming a wall of said last mentioned chamber, a conduit connecting said last mentioned chamber with said pipe on the side of said first valve remote from said pump, a lever connecting said diaphragms and having a pivot point therebetween, and a means operatively connecting said lever to said last mentioned switch so as to open said last mentioned switch when pressure in said first housing exceeds pressure in the second housing by a predetermined amount.

2. An electrical control mechanism for a water supply system having a pump, a motor for said pump, and a pipe connected for receiving water from the pump, comprising a check valve in said pipe for preventing back flow therein, an electric line to said motor, a switch in said line, a second switch in said line between said first mentioned switch and said motor, an electric means movable in response to temperature changes, a toggle linkage connecting said means with said second mentioned switch for opening said second switch when said means becomes warm, an electrical circuit connected to said line between said switches for heating said means, a switch in said circuit, a housing forming a chamber, a diaphragm forming a wall of said chamber, a conduit connecting said chamber with said pipe on the pump side of said valve, a second housing forming a chamber, a diaphragm forming a wall of said last mentioned chamber, a conduit connecting said last mentioned chamber with said pipe on the side of said valve remote from said pump, a lever connecting said diaphragms and having a pivot point therebetween, and a means operatively connecting said lever to said last mentioned switch so as to open said last mentioned switch when pressure in said first housing exceeds pressure in the second housing by a predetermined amount.

3. An electrical control mechanism for a water supply system having a pump, a motor for said pump, and a pipe connected to the water output of said pump, comprising a check valve in said pipe for preventing back flow therein, an electric line to said motor, a switch in said line, an electric means including a thermostatic element movable in response to temperature changes, a toggle linkage connecting said means with said switch for opening said switch when said element becomes warm, an electrical circuit connected to said line on the motor side of said first mentioned switch for heating said element, a housing forming a chamber, a diaphragm forming a wall of said chamber, a conduit connecting said chamber with said pipe on the pump side of said valve, a second housing forming a chamber, a diaphragm forming a wall of said last mentioned chamber, a conduit connecting said last mentioned chamber with said pipe on the side of said valve remote from said pump, a lever connecting said diaphragms and having a pivot point therebetween, and a means operatively connecting said lever to said last mentioned switch so as to open said last mentioned switch when pressure in said first housing exceeds pressure in the second housing by a predetermined amount.

4. An electrical control mechanism for a water supply system having a pump, a motor for said pump, and a pipe connected to said pump for carrying water from said pump, comprising a check valve in said pipe for preventing back flow therein, an electric line to said motor, a switch in said line, an electric means including a thermostatic element movable in response to temperature changes, a linkage connecting said means with said switch for opening said switch when said element becomes warm, an electrical circuit connected to said line for heating said element, a switch movable between positions for controlling said electrical circuit, a pressure responsive unit connected to said pipe on the pump side of said valve, a pressure responsive unit connected to said pipe on the side of said valve remote from said pump, and a lever connecting said units and having a pivot point therebetween, said lever being operatively connected to said last mentioned switch so as to move said last mentioned switch to one of its controlling positions in response to pressure differences in said units.

5. An electrical control mechanism for a fluid system having a pump, a motor for said pump, and a pipe operatively connected for receiving the output fluid from the pump, comprising a check valve in said pipe for preventing back flow therein and having a spring loaded valve element for regulating the pressure required to open the valve, a by-pass passage around said valve, a check valve in said passage, an electric line to said motor, a switch in said line, a second switch in said line between said first mentioned switch and said motor, an electric means including a thermostatic element movable in response to temperature changes, a linkage connecting said means with said second mentioned switch for opening said second switch when said element becomes warm, an electrical circuit connected to said line between said switches for heating said element, a switch in said circuit, and a means responsive to the pressures in said pipe on opposite sides of said valves for controlling said last mentioned switch so as to open said last mentioned switch in response to a predetermined pressure difference between opposite sides of said valves.

6. An electrical control mechanism for a fluid system having a pump, a motor for said pump, and a pipe connected to said pump for carrying the output fluid of said pump, comprising a check valve in said pipe for preventing back flow therein, an electric line to said motor, a switch in said line, a second switch in said line between said first mentioned switch and said motor, an electric means movable in response to temperature changes, a linkage connecting said means with said second mentioned switch for opening said second switch when said means becomes warm, an electrical circuit connected to said line for heating said means, a switch in said circuit, and a means responsive to the pressures in said pipe on opposite sides of said valve for controlling said last mentioned switch so that said last mentioned switch is open when the pressure on the pump side of said valve exceeds the pressure on the other side of said valve by a predetermined amount.

References Cited in the file of this patent

UNITED STATES PATENTS

| | | |
|---|---|---|
| 1,744,684 | Griffith | Jan. 21, 1930 |
| 1,784,205 | Seeger | Dec. 9, 1930 |
| 1,980,799 | Hardesty | Nov. 13, 1934 |
| 2,461,076 | Neeson | Feb. 8, 1949 |
| 2,517,739 | Turner | Aug. 8, 1950 |
| 2,583,814 | Burklin | Jan. 29, 1952 |